United States Patent Office 3,575,871
Patented Apr. 20, 1971

3,575,871
TETRAARYL ARYLAMINIUM SALTS AND USE AS INFRARED ABSORBERS
Peter Vincent Susi, Middlesex, and Norma Ann Weston, Somerville, N.J., assignors to American Cyanamid Company, Stamford, Conn.
No Drawing. Continuation-in-part of applications Ser. No. 337,036, June 22, 1964, and Ser. No. 607,390, Jan. 5, 1967, now Patent No. 3,484,467, which is a continuation-in-part of application Ser. No. 333,728, Dec. 26, 1963, which in turn is a continuation-in-part of application Ser. No. 281,056, May 16, 1963. This application Feb. 23, 1967, Ser. No. 617,859
Int. Cl. G02b 5/22; C08f 45/60; C08g 51/60
U.S. Cl. 252—300                                    10 Claims

ABSTRACT OF THE DISCLOSURE

A defined class of diaryl-(N,N-diarylaminoaryl)aminium salts useful as infrared absorbers is disclosed; especially the bis(p-dialkylaminophenyl)[N,N-bis(p-dialkylaminophenyl)-p-aminophenyl]aminium salts, such as bis(p-diethylaminophenyl)[N,N - bis(p - diethylaminophenyl)-p-aminophenyl]aminium hexafluoroantimonate. The aminium salts are obtained by oxidation of N,N,N', N'-tetraarylarylenediamines with silver salts.

This application is a continuation-in-part of application Ser. No. 337,036 filed June 22, 1964 and of application Ser. No. 607,390 filed Jan. 5, 1967, now U.S. Pat. No. 3,484,467, said latter two applications being, in turn, continuation-in-part applications of application Ser. No. 333,728 filed Dec. 26, 1963; said latter application being in turn, a continuation-in-part application of of application Ser. No. 281,056 filed May 16, 1963; said applications Ser. No. 337,036, Ser. No. 333,728 and Ser. No. 281,056 having now been abandoned.

This invention relates to a new class of "aminium" salts and to the use of said salts as infrared absorbers. It also relates to a process for making said salt and to a series of new compounds which are intermediates in said process.

The new aminium salts of the invention are represented by the following formula:

(I)

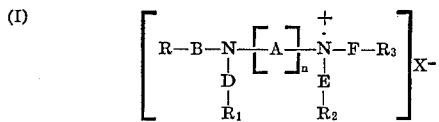

wherein A, B, D, E and F represent bivalent benzene or bivalent naphthalene radicals; $n$ is 1 or 2; R, $R_1$, $R_2$ and $R_3$ represent hydrogen, alkyl, alkoxy, alkenyl, aralkyl, aryl, alkaryl, acyl or

radicals, said $R_4$ and $R_5$ in turn representing hydrogen, alkyl, alkenyl, aralkyl, aryl, alkaryl or acyl radicals; said A, B, D, E and F and R through $R_5$ which are other than hydrogen being either unsubstituted or substituted with inert groups such as lower alkyl, lower alkoxy, hydroxy, cyano, carboxy, sulfo, halogen and the like; and $X^-$ represents an anion.

The aminium salts of Formula I are derived from N, N'-substituted diamino compounds of the formula (II)

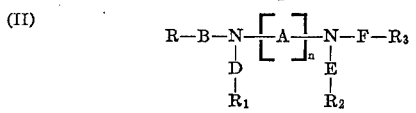

wherein A, B, D, E and F and R through $R_5$ have the same meaning as in Formula I, by the oxidation of one of the amino groups thereof to form the aminium cation, as described hereinafter.

The compounds of Formula II may be prepared as follows. On the one hand, a compound having the formula (III)          $H_2N\{A\}NH_2$ wherein A has the same meaning as in Formulas I and II is reacted with a substituted or unsubstituted halobenzene or halonaphthalene, any substitutent present therein being any one of those within the definition of R, $R_1$, $R_2$ or $R_3$ given above in connection with Formulas I and II, except

A typical reaction is that of a halobenzene and p-phenylenediamine, as follows.

(1)

| alkali

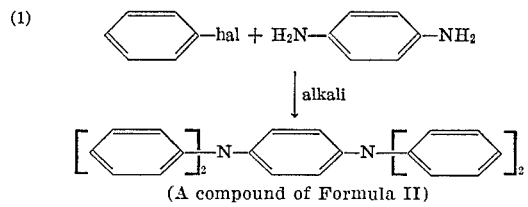

(A compound of Formula II)

On the other hand, in instance where R, $R_1$, $R_2$ and $R_3$ of Formula II represent

the compounds (of Formula II) are prepared by a series of three reactions utilizing as starting materials a nitro-substituted halobenzene (or nitro-substituted halonaphthalene) in which the nitro group can be in the ortho, meta or para position with respect to the halo group, and a compound of Formula III as above. A typical series of reactions utilizing p-nitrohalobenzene and p-phenylenediamine as starting reactants is as follows:

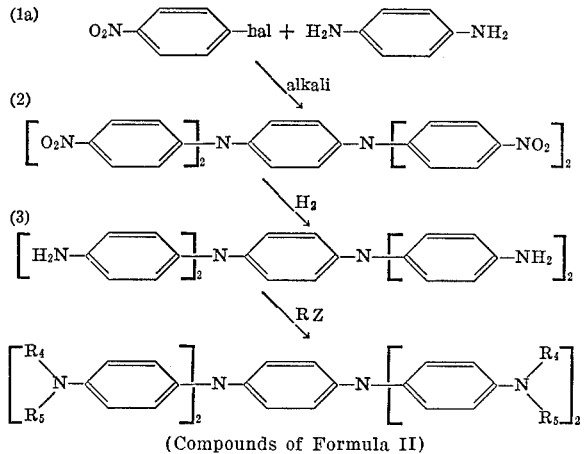

(Compounds of Formula II)

In reaction (3), RZ represents an alkylating agent in which R corresponds to $R_4$ or $R_5$ in Formula II. Suitable RZ compounds are set forth hereinbelow.

Reactions (1) and (1a) are carried out in a suitable solvent, preferably dimethylformamide, in the presence of an alkali, such as sodium or potassium carbonate and optionally and preferably in the presence of copper powder. The reactions can be effected in a step-wise fashion, so that from 1 to 4 of the amino hydrogens (of the diamine) are replaced, thereby permitting preparation of unsymmetrical derivatives.

With respect to reaction (1), illustrative halobenzenes which may be used include, for example, iodobenzene, bromobenzene, p-iodotoluene, o-iodotoluene, m-bromotoluene, p-iodododecylbenzene, p-iodoallylbenzene, 4-bromodiphenylmethane, 4 - bromodiphenyl, 4 - iodoacetophenone, 4-bromobenzophenone, 3-bromoanisole, etc.

Also, utilizable halonaphthalenes include 1-iodonaphthalene, 2-bromonaphthalene, 1-bromo-4-methylnaphthalene, 1 - bromo - 4 - butoxynaphthalene, 1-bromo-4-ethylnaphthalene, 1-iodo-6-methoxynaphthalene, etc.

With respect to reaction (1a), nitro-substituted halobenzenes which may be used include o-, m- and p-nitrohalobenzenes, such as p-nitrochlorobenzene, m-nitrochlorobenzene, p - nitrobromobenzene, o - nitroiodobenzene, p-nitrofluorobenzene, 3,4-dichloronitrobenzene, 2-chloro-5 - nitrotoluene, 2 - chloro-5-nitroethylbenzene, 2-nitro-5-bromotoluene, 2-chloro-5-nitroanisole and the like.

Compounds of Formula III utilizable in both reactions (1) and (1a) include phenylenediamines, biphenyldiamines, naphthalenediamines and bi(naphthylamines). Illustrative phenylenediamines include p-phenylenediamine, o-phenylenediamine, m-phenylenediamine, p-tolylenediamine, 2,5-dimethoxy-p-phenylenediamine, 2,6-dimethyl-p-phenylenediamine, etc. Illustrative biphenyldiamines include benzidine, 2,2'-biphenyldiamine, 3,3'-biphenyldiamine, 2,4'-biphenyldiamine, 6,6'-dimethyl-2,2'-biphenyldiamine, o-tolidine, o-dianisidine, m-tolidine, etc. Illustrative naphthalenediamines include 1,4-naphthalenediamine, 1,5 - naphthalenediamine, 2,6 - naphthalenediamine, 2 - ethoxy - 1,4 - naphthalenediamine, 2 - ethyl-1,4-naphthalenediamine, 4,8 - dimethoxy - 2,6 - naphthalenediamine, etc. Illustrative bi(naphthylamines) include naphthidine, 4,4'-bi(2-naphthylamine), 1,1-diethoxy-4,4'-bi(2-naphthylamine), 2,2' - bi(1 - naphthylamine), 2,4 - bi(1-naphthylamine), 2,2'-diamino-4,4'-bi-1-naphthol, etc.

Reduction of the nitrocompound (Reaction 2) is effected conveniently by catalytic hydrogenation in a suitable solvent, again preferably dimethylformamide. Standard catalysts for the hydrogenation of aromatic nitro compounds may be used. These include palladium on charcoal and Raney nickel.

The amino compound from Reaction 2 is then reacted in a suitable solvent, such as aqueous acetone, with the reactant RZ according to Reaction 3. RZ may be an alkyl halide, such as methyl chloride, ethyl iodide, propyl bromide, butyl iodide, hexyl bromide, octyl bromide, dodecyl bromide or a carboxy-substituted alkyl halide, such as chloroacetic acid; or an alkyl sulfate, such as methyl sulfate, ethyl sulfate and the like; or an alkyl arylsulfonate, such as methyl p-toluenesulfonate. An allyl halide, such as allyl bromide, also may be used. Other alkylating agents which may be used include acrylonitrile and alkylene oxides, such as ethylene oxide. An alkali or alkaline salt such as sodium carbonate or potassium carbonate also normally is used. Reaction proportions and conditions are so selected that either one or two R groups per amino group are introduced.

As has been indicated previously, the aryl rings of Formula I may bear inert substituents, such as lower alkyl or alkoxy. These substituted products may be derived from the corresponding substituted starting materials of halobenzenes or naphthalenes or the nitrosubstituted halobenzenes or naphthalenes in Reactions 1 and 1a. As also indicated previously, certain of the intermediate compounds, viz., those of the type formed in Reactions 1 and 3 are believed to be new compounds.

Conversion of the compounds of Reaction 1 or 3 to the salts of Formula I is effected by oxidation of the amino compounds. This reaction is carried out in organic solvent solution by reacting the (polyamino) compound of Formula II with a silver salt of a suitable acid. This general method is shown in Neunhoeffer et al., Ber. 92, 245 (1959). Dimethylformamide is a good solvent for use as the reaction medium. Others, such as acetone may be used. A wide variety of silver salts may be used. These include the perchlorate ($ClO_4^-$), fluoborate ($BF_4^-$), trichloracetate ($CCl_3COO^-$), trifluoroacetate ($CF_3COO^-$), picrate, hexafluoroarsenate ($AsF_6^-$), hexafluoroantimonate ($SbF_6^-$), benzenesulfonate ($C_6H_5SO_3^-$), ethanesulfonate ($C_2H_5SO_3^-$), phosphate ($PO_4^{---}$), sulfate ($SO_4^{--}$), nitrate ($NO_3^-$), chloride ($Cl^-$) and the like.

Various "aminium" compounds such as tris(p-dialkylaminophenyl)aminium salts previously have been proposed for use in various substrates to decrease transmission in the infrared region of the spectrum. Such salts do absorb strongly in the "near" infrared region of the spectrum. However, most effective protection occurs in the vicinity of 960 millimicrons. Suitable compounds capable of broad absorption at longer wavelengths in the near infrared have been desired but in the past have not been available. It is, therefore, a principal object of the present invention to provide compounds having such broader absorption bands.

In accordance with the present invention this object is accomplished by use of compounds of Formula I. Compounds of this invention absorb broadly in the near infrared region of the spectrum at wavelengths longer than those obtained with compounds previously available. Improved absorption is obtained in the region of longer wavelengths between about 1000 and about 1800 millimicrons. Many of the compounds also have desirable absorption at shorter wavelengths in the near infrared region. These compounds also transmit a useful amount of visible light.

Radiant energy from the sun is frequently grouped into three regions, the near-ultraviolet, the visible and the near-infrared. Together these three regions cover the range of wavelengths of from 0.290 micron to about 5.0 microns. Somewhat arbitrarily, the near-ultraviolet spectrum may be considered to cover the region of 0.300–0.400 micron; the visible spectrum, the region of 0.400–0.700 micron; and the near-infrared spectrum the region of 0.700–5.0 microns.

Heat from the sun is essentially due to the near-infrared radiant energy. Other high temperature bodies, such as tungsten filaments, fluorescent lamps, carbon arcs, etc., also radiate energy in the near infrared region. For practical purposes, this region often is defined as falling between 0.7 to 5.0 microns, this being the region where common sources of infrared radiation emit substantially all of their infrared energy. Over half of the total radiation energy emitted by the sun or electrical lamps lies in the near-infrared region. This is shown in the following tables.

TABLE 1

[Approximate distribution of radiant energy from several energy sources]

| | Percent of total radiant energy emitted | | | |
|---|---|---|---|---|
| | $.3-.4\mu$ | $.4-.7\mu$ | $.6-1.6\mu$ | Above $.7\mu$ |
| Sunlight (reaching earth) | 5 | 42 | 54 | 53 |
| Tungsten lamp, 500 w | 0.1 | 10 | 53 | 90 |
| Fluorescent lamp | 5 | 35 | 28 | 60 |
| Carbon filament heater | 0 | 1 | 28 | 99 |
| Nonluminous heaters | 0 | 0 | 1.3 | 100 |

Accordingly, it may be seen that a large proportion of the energy transmitted by our common light sources serves no useful purpose with respect to illumination, but contributes to the development of heat in the material receiving the radiation.

It is not readily possible to assign limits to the amount which it is desirable to use. In general, the limiting maximum is only an economic one. As to the minimum, it depends on whether the salt is disseminated uniformly through the substrate or is concentrated in a barrier layer of the same or a different substrate. When disseminated through a substrate, usually to protect the latter, there should be provided at least about 0.005 weight percent of the substrate. When concentrated in a barrier layer this is equivalent to about 0.01 gram per square foot of surface of a plastic substrate of ⅛ inch thickness.

The compounds of this invention have many uses arising from the valuable combination of infrared absorbency and transparency to visible light. These uses may be considered as falling within three major areas according to the function of the infrared absorber.

In the first area of use, these compounds function to filter or screen out infrared radiation and prevent its transmission through a substrate on or in which these compounds are dispersed. In this area, specific applications are in sunglasses, welder's goggles or shields, astronaut's face-plates, and face-plates in fire-fighters' reflective protective suits where transparency for vision coupled with protection of eyes from infrared radiation are desired. Also, these compounds may be incorporated in transparent plastic sheets or films for windows, doors skylights, etc. in buildings, greenhouses, automobiles, aircraft, ships, etc. to screen out infrared radiation and minimize heat build-up in the interiors of such structures while still transmitting visible radiation. In such applications, these compounds may be dispersed in or on a rigid plastic substrate or may be dispersed in a thin plastic film useable alone or adhered to an untreated substrate, which may be glass or plastic. For example, for automobile safety glass windshields, the plastic interlayer between the two sheets of glass may have the infrared absorber incorporated therein. Also, for store, office, or residential windows, a plastic film containing these compounds may be adhered to the glass or may be hung as a "window shade" immediately inside the window and rolled up when not needed. For sunglasses, aircraft windows, and sky-lights, these compounds may be incorporated in the plastic of which such articles are made, either as a uniform dispersion throughout or as a barrier layer adjacent one surface thereof.

In the second area of use, these compounds function to absorb infrared radiation and accumulate it as heat in order to increase the temperature of those materials containing these compounds. Thus, these compounds can be incorporated onto natural or synthetic fibers used in clothing to make such clothing warmer in cold climates even though such clothing may be light in color. Also, these compounds can be dissolved in water or incorporated in plastic particles, flakes, or film strips which float on water to increase the rate of evaporation of the water (or other liquid) by solar or other infrared radiation for production of distilled water or for increasing salt concentration in the remaining liquor or for recovery of salt from solution. Further, these compounds can be incorporated into materials to improve drying rates without substantially changing the color of such materials, as, for example, colored inks, paints, enamels, bathing suits, etc. Likewise, incorporation of these compounds into polymerizable materials can serve to increase the rate of polymerization under infrared radiation by increasing the efficiency with which such radiation is absorbed. Also, since different colors absorb radiation at different rates, varying amounts of these compounds can be added to inks, paints, or enamels of various colors to so modify their drying rates as to make them uniform regardless of color for ease, uniformity, and economy in processing articles coated therewith.

Several processes currently in commercial operation use powdered ink formulations which are placed on paper or other substrate and fused in place by infrared radiation. In some reproduction and copying systems, the powdered ink formulations, which comprise carbon black (for infrared absorption capability and optical contrast with background) and thermoplastic polymer resins, are electrostatically attracted to the desired location either on metal and then transferred to paper or directly on specially coated paper. In such processes, only black inks have been useable to date. The present compounds can provide the necessary infrared absorption while permitting pigments of various colors to be used in such processes. Also, powdered inks are used to provide a "raised" printing on greeting cards, match boxes, calling cards, etc. by a process which involves printing a design on paper with a clear adhesive mixture and then coating with the powdered ink which adheres only to the adhesive-printed areas. This paper is then passed under an infrared source to melt and thus fix the ink. Incorporation of these compounds into these inks can reduce the heat required in the infrared source, increase the speed with which the inks can be fused, permit a wider range of colors to be used without danger of scorching the paper background before the powdered ink is set, and permit use of light colored inks on dark colored background paper without scorching the dark paper.

Some photothermography systems of photoreproduction, such as the "Thermofax" system of copying, use a paper coated to make it more heat sensitive during the development of the image by exposure to infrared radiation. Incorporation of these compounds into the surface coating of the paper used for this and similar processes would make the paper even more heat sensitive without losing contrast between the printing and background making feasible lower operating temperatures or faster operation of copying devices using such paper.

Micro-encapsulation is the process of coating materials in the form of small spheres or capsules (diameters of about 1 to 200 microns) with natural or synthetic polymeric materials, such as polymethylmethacrylate. The coating retains the contents in finely divided state, in each separate sphere, until such are released for use by rupturing the capsule walls, which can be by mechanical means, such as pressure, or by application of heat, such as by exposure to radiant energy. The incorporation of the compounds of this invention into the coating makes the wall more sensitive to rupture by exposure to infrared radiation, thereby requiring less exposure time or lower intensity infrared radiation to effect rupture. Also, by use of different amounts of these compounds in the coatings of different capsules, such capsules can be made to rupture on absorption of different amounts of radiation, thereby producing a record of the relative quantities of infrared radiation impinging on any areas containing mixtures of such capsules.

Additionally, these compounds can serve to magnify the effects of infrared radiation falling on sensing elements when such elements are coated with such compounds simplifying amplification circuitry to convert signals from such elements to useable currents or voltages. Thus, sensors for fire detection devices may be so treated to make them more sensitive to the presence of flames. Also, sensors in data processing machines may be so treated to make them more sensitive to heat effects where such are used to operate electrical circuits.

In the third area of use, these compounds function by a miscellaneous assortment of mechanisms. Included in this category are such applications as incorporating these compounds into colored inks for use in ball-point or other pens so such inks will reproduce by those processes, such as "Thermofax," which rely on infrared absorption by the ink on the document being copied. At present, carbon black must be used, limiting the inks for such purpose to black inks. Also incorporation of such compounds into face creams and dyes for clothing and other fabrics can serve to render the wearer invisible to infrared detection devices, TABLE II
[Approximate distribution of radiant energy of sunlight]

| Region (μ) | Percent of total | Percent of infrared |
| --- | --- | --- |
| 0.3–0.4 | 5 | |
| 0.4–0.7 | 42 | |
| 0.7–1.0 | 23 | 43.5 |
| 1.0–1.3 | 12 | 22.5 |
| 1.3–1.6 | 4.5 | 8.5 |
| 1.6–1.9 | 4.5 | 8.5 |
| 1.9–2.7 | 5 | 9.5 |
| 2.7–up | 4 | 7.5 |

This table indicates that within the near-infrared region, the greater part of the infrared energy is radiated within the region from about 0.7 to about 2.0 microns. For example, in normal sunlight some two-thirds of the radiant energy is at wavelengths of from about 0.7 to about 1.3 microns.

It also may be noted in Table II that some 43–44% of the total infrared radiation in sunlight is in the region just above about 0.7 micron. The latter is about the upper limit of the visible range which, as noted above, usually is defined as from about 0.4 to about 0.7 micron, hence the "near" infrared designation. While by the foregoing definition the near-infrared region extends only down to about 0.7 micron, for purposes of this invention the region of particular interest extends from about 0.65 micron to about 1.3 microns. In the following discussion this region will be designated as the (NIR).

In many circumstances it is desirable to filter out nonvisible radiations of the near-infrared region without materially diminishing transmission of visible radiations. There are many potential applications for materials that will transmit a major portion of the visible radiations but at the same time be at least semiopaque to heat-producing infrared radiation, particularly that in the above-noted (NIR). Among such possible applications may be mentioned sunglasses, welders' goggles and other eye protective filters, windows, television filters, projection lenses and the like. In many, if not most, of such uses the primary object is to protect the human eye from the adverse effects of radiation in the near infrared.

Experience has shown that sunglasses, as an illustrative example, should be capable of transmitting at least about 10% of incident visible light shorter than about 0.65 micron. However, to provide adequate protection for the human eye, transmission should be less than forty percent at from about 0.65 to about 0.75 micron and not over about ten percent between about 0.75 and about 0.95 micron. Preferably, some 20% or more of visible light will be transmitted. In the two other noted ranges, preferably transmission should not exceed about five percent and one percent respectively.

Other protective optical filters may vary as to requirements in the visible range. In most cases, however, transmission in the near-infrared should not exceed the indicated limitations. This applies, for example, not only to other eye protective devices as widely different as welders' goggles and window glass, but also to protecting inanimate material as in the case of projection lenses. Optimum protective utility, therefore, ordinarily requires relatively good transmission of radiation below about 0.65 micron but reduced or minimized transmission above that value. Obviously complete cutoff at exactly this, or any other wavelength, is impossible. Nevertheless, for the purposes of this invention, cutoff should be as sharp as possible within a minimum spread of wavelength at about 0.65 micron.

It will be understood that while the present invention contemplates the incorporation of the novel infrared absorbing compounds in any material for increasing the infrared absorption thereof, a particularly important aspect is the incorporation of the compounds in polymeric organic (plastic) materials or substrates having visible light transmitting properties which make them suitable for formation into and use as optical filters, lenses and the like. Illustrative examples of such polymeric materials include: cellulose nitrate, cellulose acetate and the like; regenerated cellulose and cellulose ethers as for example, ethyl and methyl cellulose; polystyrene plastics such as polystyrene per se and polymers and copolymers of various ring-substituted styrenes such for example as o-, m- and p-methylstyrene and other ring-substituted styrenes as well as side-chain substituted styrenes such as alpha-, methyl- and ethylstyrene and various other polymerizable and copolymerizable vinylidenes; various vinyl polymers and copolymers such as polyvinyl butyral and other acetals, polyvinyl chloride, polyvinyl acetate and its hydrolysis products, polyvinyl chloride-acetate copolymers and the like; various acrylic resins such as polymers and copolymers of methyl acrylate, methyl methacrylate, acrylamide, methylolacrylamide, acrylonitrile and the like; polyolefins such as polyethylene, polypropylene and the like; polyesters and unsaturated-modified polyester resins such as those made by condensation of polycarboxylic acids with polyhydric phenols or modified using unsaturated carboxylic acid and further modified by reacting the alkyd with another monomer; polymers of allyl diglycol carbonate; and various copolymers using as a cross-linking monomer an allyl ester of various acids. Of particular interest and preferred herein as substrates are cellulose acetate, methyl methacrylate, polystyrenes and polymers of allyl diglycol carbonates.

Any one such substrate may, and usually does, vary from the others very appreciably in its transmission of radiant energy at various wavelengths. Nevertheless, if not modified, none meet the foregoing transmission requirements. Some additive is necessary to decrease the infrared transmission without adversely effecting transmission in the visible range.

Heat resistance of the salts of this invention can be demonstrated when the aminium salts are dispersed in plastic materials, or when they are dissolved in suitable solvents. They are adequately resistant to exposure to temperatures up to about 200° C. This temperature is frequently encountered in the processing of plastic substrates such as those discussed above. Accordingly, compounds of this invention are suitable for purposes of use in such cases.

Products of this invention have good light and heat stability when incorporated into organic plastic substrates. Satisfactory absorption by transparent plastics of radiant energy in the 1000 to 2000 millimicron region (as given off by the sun or by other light sources) has not been possible heretofore. This portion of infrared radiation is a sizable portion of the total infrared radiation from sunlight, incandescent and other lamps.

In use, the salts of the present invention may be incorporated in any suitable plastic or applied on suitable transparent substrates of plastic or glass. This is done by any of several known procedures, including for example; solution casting or dipping; hot milling; burnishing; or by dyeing. Organic plastic material containing the salts can be molded into formed articles such as sheets and plates.

In any method of use, the salts may be incorporated as a barrier layer in or near one surface of a substrate or be disseminated therethrough. Choice of either practice depends on the type of protection used and the physical method used to combine the substrate and the salt or salts.

Either practice can be used to protect the treated material. Either can also be used to form a protective barrier between an object to be protected and the source of the infrared radiation. In the latter case, protection is usually provided by combining salt and organic substrate in a relatively thin layer or sheet which is then used as the protective barrier. Protection of an object also can be obtained by coating the salts, in a suitable vehicle, directly onto substrates such as glass or formed plastic objects whether to protect the substrate or in forming a protective barrier for other objects.

EXAMPLE 7

N,N,N',N'-tetrakis(p-dioctylaminophenyl)-p-phenylenediamine

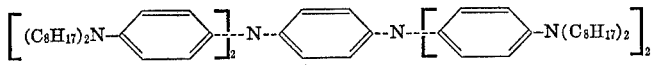

The procedure of Example 3 is followed substituting an equivalent amount of octyl iodide for the ethyl iodide.

EXAMPLE 8

N,N,N',N'-tetrakis(p-didodecylaminophenyl)-p-phenylenediamine

The procedure of Example 3 is followed substituting an equivalent amount of dodecyl bromide for the ethyl iodide.

EXAMPLE 9

N,N,N',N'-tetrakis(p-ethylaminophenyl)-p-phenylenediamine

The procedure of Example 3 is followed substituting 18.7 parts (0.12 mole) of ethyl iodide and 16.6 parts (0.12 mole) of potassium carbonate for the amounts used therein.

EXAMPLE 10

N,N,N',N'-tetrakis(p-nitrophenyl)benzidine

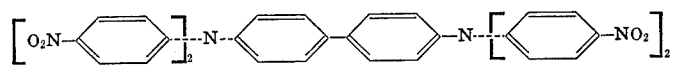

A mixture of 9.2 parts (0.05 mole) of benzidine, 47.3 parts (0.3 mole) of p-nitrochlorobenzene, 16.6 parts (0.12 mole) of anhydrous potassium carbonate, 1.0 part of copper powder and 75 parts dimethylformamide is stirred and refluxed for four days. The mixture is then filtered, washed well with dimethylformamide, water, and acetone, and dried. About 24.0 parts of an orange powder is obtained (71% yield). Melting point 370°–374° C.

EXAMPLE 11

N,N,N',N'-tetrakis(p-aminophenyl)benzidine

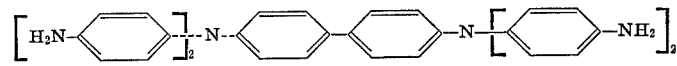

A mixture of 24.0 parts (0.035 mole) of N,N,N',N'-tetrakis(p-nitrophenyl)benzidine (from Example 10), 1 part of 10% palladium-on-carbon catalyst and 100 parts of dimethylformamide is hydrogenated at 80° C. in a hydrogenation autoclave until the theoretical pressure drop is observed. The mixture is filtered and the filtrate is diluted with 300 parts of water. The solid which separates is recrystallized from a mixture of dimethylformamide and ethanol, giving about 11.2 parts (55% yield) of product, melting at 313–316° C.

Calcd. for $C_{36}H_{32}N_6$ (percent): C, 78.8; H, 5.84; N, 15.3. Found (percent): C, 77.9; H, 5.90; N, 16.7.

EXAMPLE 12

N,N,N',N'-tetrakis(p-dimethylaminophenyl)benzidine

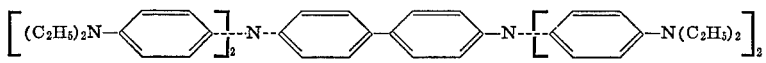

A mixture of 11.0 parts (0.02 mole) of N,N,N',N'-tetrakis(p-aminophenyl)benzidine, 37.4 parts (0.24 mole) of ethyl iodide, 22.1 parts (0.16 mole) of anhydrous potassium carbonate, and 160 parts of 80% aqueous acetone is stirred and refluxed for 5 hours. The mixture is cooled and filtered, and the solid is washed well with water and then with acetone and dried. The product is recrystallized from hot dimethylformamide to give a solid, about 9.5 parts (62% yield), melting point 213°–214.5° C.

Calcd. for $C_{52}H_{64}N_6$ (percent): C, 80.83; H, 8.29; N, 10.88. Found (percent): C, 78.21; H, 8.14; N, 11.49.

EXAMPLE 13

Bis(p-diethylaminophenyl)[N,N-bis-(p-diethylaminophenyl)-p-aminophenyl]aminium hexafluoroarsenate

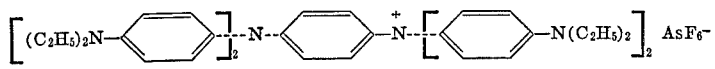

To a solution of 3.49 parts (0.005 mole) of N,N,N',N'-tetrakis(p - diethylaminophenyl) - p - phenylenediamine (product of Example 3) in 25 parts of hot dimethylformamide is added 1.49 parts (0.005 mole) of silver hexafluoroarsenate in 25 parts of dimethylformamide. After stirring for ½ hour, the mixture is filtered and the filtrate diluted with 350 parts of ether. On cooling in Dry-Ice-acetone mixture the product separates. There is obtained about 3.5 parts of green solid melting at 184–185° C.

such as the "Sniperscope" or "Snooperscope" which operate by reflection of infrared radiation from the object, e.g., soldiers, tents, netting over guns, etc., to be detected back to a detector. Further, incorporation of such compounds into the paints used to cover non-luminous radiating surfaces, such as steam or hot water radiators, radiant heating wall, floor, or ceiling panels, etc. can serve to increase the efficiency of radiation of heat energy from such bodies to the enclosure surrounding them even though the paints are light in color or contain metal pigments.

Since growth rate of plants is sensitive to the wave lengths of incident light, interposition of a film or sheet containing these compounds between such plants and the radiant energy source can serve to modify this rate. For example, germination of lettuce seeds, and the like, is promoted most at about 650 millimicrons and is inhibited most at about 730 millimicrons. By suitable selection of these compounds and concentration in such film or sheet, substantially all the radiation at 730 millimicrons can be absorbed while a high proportion of that at 650 millimicrons can be transmitted to these plants to maximize the rate of germination.

The foregoing merely indicates some of the numerous uses for these compounds. From this listing and the properties of these compounds discussed elsewhere herein, many other uses for these compounds will immediately become apparent.

The invention will be further illustrated in conjunction with the following examples. Therein, unless otherwise noted, all parts and percentages are by weight and all temperatures are in degrees centigrade.

EXAMPLE 1

N,N,N',N'-tetrakis(p-nitrophenyl)-p-phenylenediamine

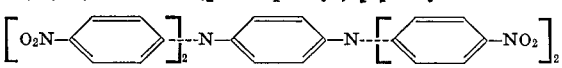

A mixture of 10.8 parts (0.1 mole) of p-phenylenediamine, 94.5 parts (0.6 mole) of p-nitrochlorobenzene, 31.7 parts (0.23 mole) of potassium carbonate and 2 parts of copper powder are stirred and refluxed for four days in 150 parts dimethylformamide. The mixture is then filtered and the solid washed well with dimethylformamide, water, acetone and then dried. There is obtained about 37 parts (59%) of red-brown solid, M.P. 387–390° C. An eight fold run gave a 76% yield of product melting at 390° C. After recrystallization from nitrobenzene, a sample had a melting point of 390°–392° C., and the following analysis:

Calcd. for $C_{30}H_{20}N_6O_8$ (percent): C, 60.8; H, 3.4; N, 14.2. Found (percent): C, 60.7; H, 3.5; N. 13.9.

EXAMPLE 2

N,N,N',N'-tetrakis(p-aminophenyl)-p-phenylenediamine

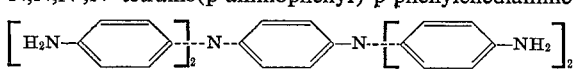

A mixture of 29.6 parts (0.05 mole) of N,N,N',N'-tetrakis(p-nitrophenyl)-p-phenylenediamine (from Example 1), 1 part of 10% palladium-on-carbon catalyst and 100 parts of dimethylformamide is hydrogenated at 90° C. in a hydrogenation autoclave until the theoretical pressure drop is obtained. The mixture is filtered and the filtrate is poured into 300 parts of water. The solid which separates is recrystallized from an ethanol-dimethylformamide mixture, giving about 15 parts (64%) of purified product, melting above 300° C., and having the following analysis.

Calcd. for $C_{30}H_{28}N_6$ (percent): C, 76.2; H, 5.97; N, 17.8. Found (percent): C, 76.1; H, 5.97; N, 17.8.

EXAMPLE 3

N,N,N',N'-tetrakis(p-diethylaminophenyl)-p-phenylenediamine

A mixture of 14.2 parts (0.03 mole) of N,N,N',N'-tetrakis(p-aminophenyl)-p-phenylenediamine (from Example 2), 56.2 parts (0.36 mole) of ethyl iodide and 33.1 parts (0.24 mole) of potassium carbonate is stirred and refluxed for four hours in 200 parts of 80% aqueous acetone. The mixture is then cooled and filtered. The solid collected is washed with water, dried, and then recrystallized from dimethylformamide-ethanol mixture. The product is obtained as a yellow-green solid, M.P. 214°–215° C. Its analysis follows.

Calcd. for $C_{38}H_{44}N_6$ (percent): C, 79.3; H, 8.7; N, 12.1. Found (percent): C, 79.2; H, 8.7; N, 12.0.

EXAMPLE 4

N,N,N',N'-tetrakis(p-dimethylaminophenyl)-p-phenylenediamine

The procedure of Example 3 is followed substituting an equivalent amount of methyl iodide for the ethyl iodide. The product melts at 272°–273° C. The analysis follows.

Calcd. for $C_{34}H_{36}N_6$ (percent): C, 78.0; H, 7.5; N, 14.4. Found (percent): C, 77.2; H, 7.7; N, 14.5.

EXAMPLE 5

N,N,N',N'-tetrakis(p-di-n-propylaminophenyl)-p-phenylenediamine

The procedure of Example 3 is followed substituting an equivalent amount of n-propyl iodide for the ethyl iodide. The product melts at 157°–158° C. The analysis follows.

Calcd. for $C_{42}H_{52}N_6$ (percent): C, 80.2; H, 9.5; N, 10.4. Found (percent): C, 80.0; H, 9.7; N, 10.9.

EXAMPLE 6

N,N,N',N'-tetrakis(p-di-n-butylaminophenyl)-p-phenylenediamine

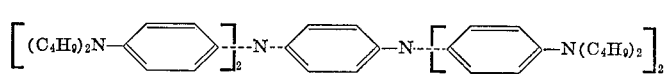

The procedure of Example 3 is followed substituting an equivalent amount of n-butyl iodide for the ethyl iodide. The product melts at 92°–94° C. The analysis follows.

Calcd. for $C_{62}H_{92}N_6$ (percent): C, 80.8; H, 10.1; N, 9.1. Found (percent) C, 81.1; H, 9.6; N, 9.3.

EXAMPLE 14

Diphenyl-(N,N-diphenyl-p-aminophenyl)aminium hexafluoroantimonate

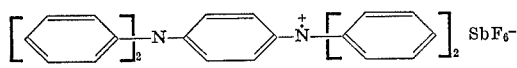

The general procedure of Example 13 is followed, except that equivalent amounts of N,N,N',N'-tetraphenyl-p-phenylenediamine and silver hexafluoroantimonate are substituted for the N,N,N',N'-tetrakis(p-diethylaminophenyl)-p-phenylenediamine and silver hexafluoroarsenate, respectively.

Similarly effective infrared absorbing compounds may be prepared after the fashion of Example 14 by utilizing as a starting reactant, in place of the N,N,N',N'-tetraphenyl-p-phenylenediamine, substituted N,N,N',N'-tetraryl arylene diamines where the substituents are present on the aryl nuclei. Thus, substituents, such as alkyl (methyl, ethyl, propyl, butyl, etc.), alkoxy (methoxy, ethoxy, butoxy, etc.), aryl (phenyl), alkaryl (tolyl), and acyl (acetyl, etc.) may suitably be present without adversely affecting the infrared absorbing power of the product compound.

EXAMPLE 15

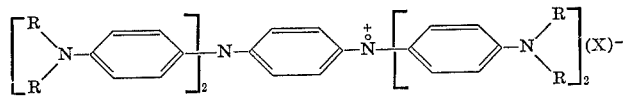

A series of aminium compounds of the above formula are prepared by the general procedure of Example 13 using the appropriate N,N,N',N'-tetrakis(p-dialkylaminophenyl)-p-phenylenediamine and silver salt.

|     | R         | X     |
|-----|-----------|-------|
| (a) | $CH_3$    | $AsF_6$ |
| (b) | $CH_3$    | $SbF_6$ |
| (c) | $C_2H_5$  | $SbF_6$ |
| (d) | $C_2H_5$  | $BF_4$  |
| (e) | $n-C_3H_7$ [1] | $AsF_6$ |
| (f) | $n-C_3H_7$ [1] | $SbF_6$ |
| (g) | $n-C_4H_9$ | $AsF_6$ |
| (h) | $n-C_4H_9$ | $SbF_6$ |
| (i) | $C_8H_{17}$ | $SbF_6$ |
| (j) | $C_{12}H_{25}$ | $SbF_6$ |

[1] The filtrate is diluted with an equal volume of ethanol.

EXAMPLE 16

Bis(p-ethylaminophenyl)[N,N-bis(p-ethylaminophenyl)-p-aminophenyl]aminium hexafluoroarsenate

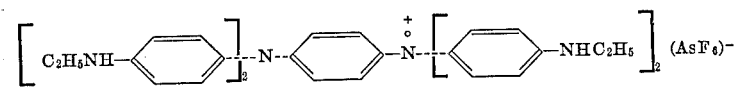

The procedure of Example 13 is repeated substituting an equivalent amount of N,N,N',N' - tetrakis(p - ethylaminophenyl)-p-phenylenediamine (product of Example 9) for the N,N,N',N'-tetrakis(p-diethylaminophenyl)-p-phenylenediamine.

EXAMPLE 17

Bis(p-diethylaminophenyl)[N,N-bis(p-diethylaminophenyl)-4'-aminobiphenylyl]aminium hexafluoroarsenate To a solution of 0.77 part (0.001 mole) of N,N,N',N'-tetrakis(p-diethylaminophenyl)benzidine (product of Example 12) in 40 parts of acetone is added dropwise with stirring a solution of 0.30 part (0.001 mole) of silver hexafluoroarsenate in 5 parts of acetone. After stirring for about 5 minutes the mixture is filtered and the filtrate diluted with 200 parts of ethyl ether. On cooling in Dry-Ice-acetone, a green solid separates, 0.71 part of product.

EXAMPLE 18

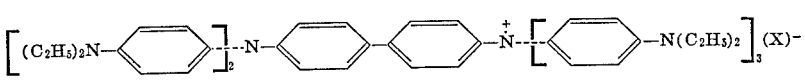

Two aminium compounds of the above formula are prepared by the procedure of Example 16 substituting an equivalent amount of the appropriate silver salt for the silver hexafluoroarsenate as shown below.

| Compound: | X |
|---|---|
| (a) | $ClO_4$ |
| (b) | $SbF_6$ |

EXAMPLE 19

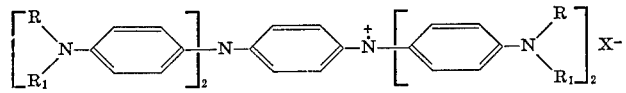

A series of aminium compounds of the above formula are prepared by the general procedure of Example 13, using the appropriate N,N,N',N'-tetrakis (p-substituted aminophenyl)-p-phenylenediamine and silver hexafluoroantimonate. The N,N,N',N'-tetrakis (p-substituted aminophenyl)-p-phenylenediamine is prepared by reacting tetrakis(p-aminophenyl)-p-phenylenediamine (from Example 2) with the appropriate alkyl or acyl halide by the procedure of Example 3 or Example 9.

| | R | R₁ |
|---|---|---|
| (a) | C₆H₅CH₂— | H |
| (b) | C₆H₅CH₂— | C₆H₅CH₂— |
| (c) | o-CH₃C₆H₄CH₂— | o-CH₃C₆H₄CH₂— |
| (d) | 1-naphthylmethyl | 1-naphthylmethyl |
| (e) | CH₂=CHCH₂— | CH₂=CHCH₂— |
| (f) | CF₃CO | H |
| (g) | CH₃CO— | H |
| (h) | p-FC₆H₄CH₂— | p-FC₆H₄CH₂— |
| (i) | CF₃CH₂— | H |
| (j) | C₂H₅— | H |
| (k) | o-HO₃SC₆H₄CH₂—¹ | H |
| (l) | C₆H₅CH=CHCH₂- | H |

¹ Analysis indicates that three of the sulfonic acid groups are present as the sodium salt and the fourth sulfonic acid group serves as the anion (X⁻) in the above formula.

EXAMPLE 20

Part (A).—N,N,N',N'-tetrakis(4-[di(2-hydroxyethyl)amino]phenyl)-p-phenylenediamine

To a solution of 47.3 parts (0.1 mole) of tetrakis-(4-aminophenyl)-p-phenylenediamine in about 200 parts of acetic acid there is added 70.4 parts (0.16 mole) of liquid ethylene oxide at 10° C. The mixture is stirred and allowed to warm to room temperature at which point an exotherm takes place. The reaction mixture is then stirred and cooled from time to time so as to maintain a gentle reflux at about 65° C. from the heat of reaction. After an additional stirring period of three hours at room temperature, the reaction mixture is diluted with about 400 parts of water followed by sufficient dilute sodium hydroxide to give a positive test on phenolphthalein indicator paper. The product is separated by filtration, washed with water and recrystallized from aqueous alcohol. The purified product (about 60 parts) melts at 190–192° C.

*Analysis.*—Calcd. for C₄₆H₆₀N₆O (percent): N, 10.2. Found (percent): N, 10.0.

Part (B).—Bis(4 - [bis(2 - hydroxyethyl)amino]phenyl) [N,N - bis(4 - [bis(2 - hydroxyethyl)amino]phenyl)-4-aminophenyl]aminium hexafluoroantimonate

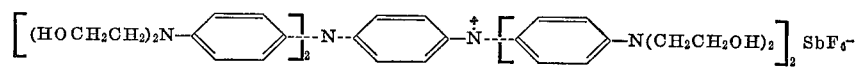

To a solution of 3.3 parts (0.004 mole) of N,N,N',N'-tetrakis(4 - [di(2 - hydroxyethyl)amino]phenyl)-p-phenylenediamine (product of A, above) in 30 parts of methanol is added 1.37 parts (0.004 mole) of silver hexafluoroantimonate. After stirring for one hour, the mixture is filtered and the residue is washed with methanol. The combined filtrates are diluted with ether and cooled in a Dry-Ice-acetone bath. The solid which separates is collected by filtration, washed with petroleum ether and dried. After 3.3 parts of a water-soluble green solid is obtained, decomposing at 121–6° C.

EXAMPLE 21

Bis(4 - [bis(2-hydroxyethyl)amino]phenyl)N,N - bis(4-[bis(2 - hydroxyethyl)amino]phenyl)-4-aminophenyl) aminium nitrate

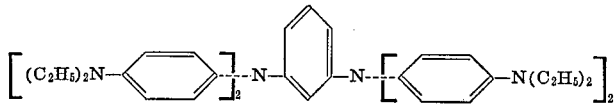

The procedure of Example 20(B) is followed substituting 0.68 part (0.004 mole) of silver nitrate for the silver hexafluoroantimonate. The product is a water-soluble green solid (about 3.0 parts) decomposing at 175–177° C.

EXAMPLE 22

Part (A).—N,N,N',N'-tetrakis(p-diethylaminophenyl)-m-phenylenediamine

A mixture of 4.72 parts (0.01 mole) of N,N,N',N'-tetrakis(p-aminophenyl)-m-phenylenediamine (product of Example 2), 15.6 parts (0.1 mole) of ethyl iodide, 11.0 parts (0.08 mole) of potassium carbonate and 100 parts of 80% aqueous acetone is stirred and refluxed for four hours. The cooled mixture is filtered and the solid is washed with water and dried. It is crystallized from butanol and acetonitrile.

*Analysis.*—Calcd. for C₄₆H₆₀N₆ (percent): C, 79.3; H, 8.61; N, 12.1. Found (percent): C, 79.6; H, 8.64; N, 11.9.

Part (B).—Bis(p-diethylaminophenyl) [N,N-bis(p-diethylaminophenyl)-m-aminophenyl]aminium hexafluoroantimonate

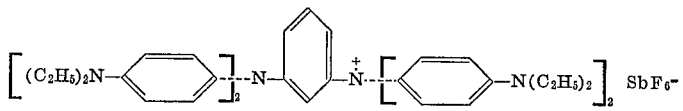

To a solution of 0.732 part (0.00105 mole) of N,N,N',N'-tetrakis(p-diethylaminophenyl) - m - phenylenediamine (product of A, above) in 25 parts of acetone is added 0.343 part (0.001 mole) of silver hexafluoroantimonate. After stirring for 3 hours at ambient temperature, the mixture is filtered and the filtrate is evaporated. The residue is the desired product.

Spectral absorption curves of organic solvent solutions of salts of this invention were determined in the visual and near infrared regions at from 0.35 to 2.00 microns. For this purpose a recording spectrophotometer fitted with a near-infrared attachment and a tungsten light source, is used. The wavelength of maximum absorbance ($\lambda_{max.}$) is determined from the curve. Absorptivity at the wavelength of the maximum absorption, designated ($a_{max.}$), is an expression of the degree of absorption. It is calculated using the following relationship:

$$a_{max.} = \frac{1}{bc} \log \frac{T_0}{T}.$$

wherein:

$a$=absorptivity
$b$=the thickness of the cell (spectrophotometer) in cm.
$c$=the concentration in grams per liter
$T$=transmittance of light passing through the solution
$T_0$=transmittance of light passing through the solvent in the same cell

EXAMPLE 23

In accordance with the foregoing discussion, spectral absorption curves of the solutions of aminium salts of Examples 13–19 and 22 in acetone and of Examples 19k, 20 and 21 in water were determined in the visual and near infrared regions at from 0.35 to 2.00 microns. The results are shown below. It will be noted that there are two absorption peaks in the near infrared region for the phenylenediamine derivatives of Examples 13, 15a–15h, 19a–19e and 19h–19l.

| Example No. | Absorption max $\lambda$ (m$\mu$) | a |
|---|---|---|
| 13 | 1,450 | 20.9 |
|  | 930 | 23.5 |
|  | 414 | 22.2 |
| 14 | 820 | 15.5 |
|  | 400 | 19.9 |
| 15a | 1,325 | 19.2 |
|  | 930 | 18.9 |
|  | 410 | 19.5 |
| 15b | 1,310 | 15.6 |
|  | 970 | 16.0 |
|  | 410 | 16.4 |
| 15c | 1,450 | 18.7 |
|  | 930 | 21.3 |
|  | 414 | 19.3 |
| 15d | 1,440 | 20.7 |
|  | 950 | 24.1 |
|  | 415 | 21.7 |
| 15e | 1,460 | 18.4 |
|  | 950 | 20.5 |
|  | 415 | 18.6 |
| 15f | 1,460 | 17.1 |
|  | 950 | 19.4 |
|  | 415 | 17.7 |
| 15g | 1,460 | 14.1 |
|  | 980 | 26.0 |
|  | 410 | 16.4 |
| 15h | 1,420 | 13.8 |
|  | 980 | 23.1 |
|  | 415 | 16.4 |
| 17 | 1,050 | 31.9 |
|  | [1] 610 | 3.3 |
|  | 400 | 24.8 |
| 18a | 1,050 | 21.0 |
|  | 610 | 2.6 |
|  | 365 | 35.0 |
| 18b | 1,055 | 24.1 |
|  | 600 | 2.6 |
|  | 365 | 31.6 |
| 19a | 1,330 | 15.7 |
|  | 835 | 11.9 |
|  | 405 | 16.4 |
| 19b | 1,400 | 12.8 |
|  | 870 | 10.8 |
|  | 410 | 12.4 |
| 19c | 1,420 | 13.5 |
|  | 870 | 11.4 |
|  | 415 | 12.8 |
| 19d | 1,410 | 10.0 |
|  | 865 | 8.7 |
|  | 410 | 10.0 |
| 19e | 1,400 | 17.4 |
|  | 880 | 16.1 |
|  | 415 | 17.9 |
| 19f | 960 | 8.2 |
|  | 520 | 2.1 |
|  | 415 | 10.5 |
| 19g | 1,050 | 21.6 |
|  | 590 | 6.7 |
|  | 420 | 21.4 |
| 19h | 1,370 | 12.1 |
|  | 860 | 9.4 |
|  | 410 | 11.5 |
| 19i | 1,200 | 16.7 |
|  | 730 | 7.9 |
|  | 420 | 13.6 |
| 19j | 1,235 | 16.1 |
|  | 925 | 15.2 |
|  | 405 | 17.0 |
| 19k [2] | 1,200 |  |
|  | 840 |  |
| 19l | 1,270 | 8.1 |
|  | 970 | 9.6 |
|  | 410 | 11.1 |
| 20 [2] | 1,035 | 36.8 |
|  | 400 | 13.1 |
| 21 [2] | 1,000 | 23.4 |
|  | 410 | 17.1 |
| 22 | 1,050 | 23.8 |
|  | 570 | 4.1 |

[1] Not $\lambda$ max.
[2] Solvent was water.

EXAMPLE 24

Spectral absorption curves of solutions of the product of Example 13 in three solvents are obtained.

| Solvent | | | |
|---|---|---|---|
| Acetone: | | | |
| $\lambda_{max.}$ (m$\mu$) | 1,470 | 940 | 414 |
| $a_{max}$ | 21.5 | 23.9 | 22.7 |
| Methanol: | | | |
| $\lambda_{max.}$ (m$\mu$) | 1,450 | 950 | 414 |
| $a_{max}$ | 20.9 | 23.5 | 22.2 |
| Methyl salicylate: | | | |
| $\lambda_{max.}$ (m$\mu$) | 1,550 | 910 | 420 |
| $a_{max}$ | 26.8 | 22.2 | 21.5 |

EXAMPLE 25

The product of Example 13 is incorporated into a cellulose acetate film by casting an acetone solution of the plastic and the additive on plate glass. These thin films exhibit strong near-infrared absorption having peaks at 1450 and 950 millimicrons. The light stability of the additive during exposure in an Atlas Fade-Ometer is measured spectrally. Curves are taken before and after each period of exposure. The percent additive remaining is calculated from the formula Percent remaining $= A_T/A_0 \times 100$ wherein $A_0$ is the absorbance at 950 millimicrons before exposure and $A_T$ is the absorbance at 950 millimicrons after T hours of exposure.

| Fade-Ometer exposure (hours): | Additive Percent remaining |
|---|---|
| 5 | 99 |
| 15 | 93 |
| 20 | 86 |
| 30 | 79 |
| 40 | 73 |
| 50 | 69 |

EXAMPLE 26

The product of Example 13 is incorporated into poly(methyl methacrylate) films in the manner described in Example 20 for cellulose acetate. The films show intense near-infrared absorption with peaks at 1450 and 950 millimicrons. The light stability of the additive is measured.

| Hour of Fade-Ometer exposure: | Percent additive remaining |
|---|---|
| 5 | 95 |
| 15 | 33 |
| 20 | 20 |

EXAMPLE 27

The product of Example 13 at a concentration of 0.10% (on weight of plastic) is incorporated into poly(methyl methacrylate) molding powder by fluxing on steam-heated roll mills. Chips, 74 mils in thickness, are compression molded. A transmission curve of the chip shows that the additive functions as a very effective near-infrared barrier while transmitting a considerable amount of visible light.

| Wavelength (millimicrons) | Percent transmittance |
|---|---|
| 2000 | 20 |
| 1700 | 0 |
| 1000 | 0 |
| 825 | 0 |
| 800 | 1 |
| 700 | 21 |
| 530 | 57 |
| 445 | 0 |
| 400 | 0 |

EXAMPLE 28

The stability of the product of Example 13 during prolonged exposure to high temperatures is measured using methyl salicylate as a high boiling solvent. Dilute solutions of the additive are heated in an oil bath at various temperatures. The percent additive remaining is measured spectrally.

| Temperature=200° C. | | Temperature=210° C. | |
|---|---|---|---|
| Heating time (mins.) | Additive, percent remaining | Heating time (mins.) | Additive, percent remaining |
| 5 | 96 | 5 | 81 |
| 8 | 94 | 8 | 59 |

EXAMPLE 29

The heat stability of the product of Example 13 in a poly(methyl methacrylate) is measured as follows: Films containing 0.32% of additive (on weight of plastic) are cast on plate glass from an acetone solution of the polymer and additive. The films are dried for several hours at 70° C. to remove the solvent. A curve of the cast film is obtained. It is assumed that no decomposition occurs during this mild heat treatment. Sections of the cast film are compression molded between electrically heated plates at various temperatures. Curves of the compression molded chips are compared to the cast film to determine the percentage of additive lost on heating.

| Molding temperature, ° C. | Additive lost/minute (average percent) |
|---|---|
| 160 | Little or none. |
| 170 | 5. |
| 180 | 10. |
| 190 | 15. |
| 200 | 20. |
| 210 | 25. |
| 220 | 28. |
| 230 | 35. |

We claim:
1. A method of increasing the infrared absorption of a material which comprises incorporating in said material at least about 0.005% by weight of a compound of the formula:

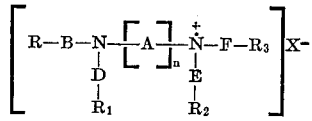

wherein A, B, D, E and F represent bivalent benzene or bivalent naphthalene radicals; $n$ is 1 or 2; R, $R_1$, $R_2$ and $R_3$ represent hydrogen, alkyl, alkoxy, alkenyl, aralkyl, aryl, alkaryl, acyl or

radicals, said $R_4$ and $R_5$ in turn representing hydrogen, alkyl, alkenyl, aralkyl, aryl, alkaryl or acyl radicals; said A, B, D, E and F and R through $R_5$ which are other than hydrogen being either unsubstituted or substituted with a radical selected from the group consisting of lower alkyl, lower alkoxy, hydroxy, cyano, carboxy, sulfo and halogen radicals; and $X^-$ represents an anion.

2. A method according to claim 1 wherein said compound is bis(p-diethylaminophenyl) [N,N-bis(p-diethylaminophenyl)-p-aminophenyl] aminium hexafluoroantimonate.

3. The method according to claim 1 wheren the compound is bis(p-dibenzylaminophenyl) [N,N-bis(p-dibenzylaminophenyl)-p-aminophenyl] aminium hexafluoroantimonate.

4. A method for protecting materials from incident infrared rays which comprises interposing between the source of said infrared rays and the material to be protected a barrier consisting essentially of an organic plastic material capable of transmitting visible light containing at least about 0.01 gram per square foot of surface of said barrier of a compound of the formula:

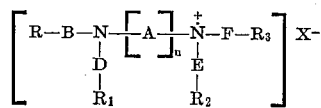

wherein A, B, D, E and F represent bivalent benzene or bivalent naphthalene radicals; $n$ is 1 or 2; R, $R_1$, $R_2$ and $R_3$ represent hydrogen, alkyl, alkoxy, alkenyl, aralkyl, aryl, alkaryl, acyl or

radicals, said $R_4$ and $R_5$ in turn representing hydrogen, alkyl, alkenyl, aralkyl, aryl, alkaryl or acyl radicals; said A, B, D, E and F and R through $R_5$ which are other than hydrogen being either unsubstituted or substituted with a radical selected from the group consisting of lower alkyl, lower alkoxy, hydroxy, cyano, carboxy, sulfo and halogen radicals; and $X^-$ represents an anion.

5. The method of claim 4 wherein said compound is bis-(p - diethylaminophenyl) [N,N-bis(p - diethylaminophenyl)-p-aminophenyl] aminium hexafluoroantimonate.

6. The method of claim 4 wherein said compound is bis(p-dibenzylaminophenyl) [N,N - bis(p-dibenzylaminophenyl)-p-aminophenyl] aminium hexafluoroantimonate.

7. The method of claim 4 wherein said barrier is in the form of a coating on the material to be protected.

8. A composition of matter consisting essentially of an organic plastic material capable of transmitting visible light having incorporated therein at least about 0.005% by weight of a compound of the formula:

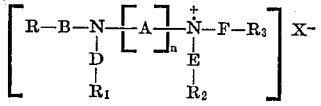

wherein A, B, D, E and F represent bivalent benzene or bivalent naphthalene radicals; $n$ is 1 or 2; R, $R_1$, $R_2$ and $R_3$ represent hydrogen, alkyl, alkoxy, alkenyl, aralkyl, aryl, alkaryl, acyl or

radicals, said $R_4$ and $R_5$ in turn representing hydrogen, alkyl, alkenyl, aralkyl, aryl, alkaryl or acyl radicals; said A, B, D, E and F and R through $R_5$ which are other than hydrogen being either unsubstituted or substituted with a radical selected from the group consisting of lower alkyl, lower alkoxy, hydroxy, cyano, carboxy, sulfo and halogen radicals; and X⁻ represents an anion.

9. A composition of matter according to claim 8 wherein said compound is bis(p-diethylaminophenyl)[N,N-bis-(p-diethylaminophenyl)-p-aminophenyl] aminium hexafluoroantimonate.

10. A composition of matter according to claim 8 wherein said compound is bis(p-dibenzylaminophenyl) [N,N-bis(p-dibenzylaminophenyl)-p-aminophenyl] aminium hexafluoroantimonate.

References Cited

UNITED STATES PATENTS

| | | | |
|---|---|---|---|
| 3,251,881 | 5/1966 | Susi et al. | 252—300X |
| 3,341,464 | 9/1967 | Susi et al. | 252—300 |

RICHARD D. LOVERING, Primary Examiner

U.S. Cl. X.R.

117—33.3; 252—316; 260—45.75, 45.9

REEXAMINATION CERTIFICATE (478th)
United States Patent [19]

Susi et al.

[11] B1 3,575,871

[45] Certificate Issued Apr. 8, 1986

[54] TETRAARYL ARYLAMINIUM SALTS AND USE AS INFRARED ABSORBERS

[75] Inventors: Peter V. Susi, Middlesex; Norma A. Weston, Somerville, both of N.J.

[73] Assignee: American Cyanamid Company, Stamford, Conn.

Reexamination Request:
No. 90/000,851, Sep. 9, 1985

Reexamination Certificate for:
| | |
|---|---|
| Patent No.: | 3,575,871 |
| Issued: | Apr. 20, 1971 |
| Appl. No.: | 617,859 |
| Filed: | Feb. 23, 1967 |

Related U.S. Application Data

[63] Continuation-in-part of Ser. No. 337,036, Jun. 22, 1964, and Ser. No. 607,390, Jan. 5, 1967, Pat. No. 3,484,467, which is a continuation-in-part of Ser. No. 333,728, Dec. 26, 1963, which is a continuation-in-part of Ser. No. 281,056, May 16, 1963.

[51] Int. Cl.$^4$ .................. G02B 5/22; C08K 5/18; F21V 9/04
[52] U.S. Cl. .................. 252/587; 427/213.3; 428/402.24; 524/204; 524/249
[58] Field of Search .................. 252/587; 524/204, 249

[56] References Cited

U.S. PATENT DOCUMENTS

3,000,852  9/1961  Merz ........................... 252/401 X
3,055,940  9/1962  Merz ........................... 564/406
3,400,156  9/1968  Milionis et al. .................. 564/8

FOREIGN PATENT DOCUMENTS

1398240  France .

OTHER PUBLICATIONS

J. Piccard: "Radicals and Meri–Quinoid Compounds", Ber., 59, pp. 1438–1444 (1926).
J. Piccard: "Colors of the Second Order", Ber., 59, pp. 1653–1655 (1926).
J. Piccard: "Absorption Colors of the Second Order", J. Am. Chem. Soc., 48, pp. 2352–2354 (1926).
O. Heunoffer and P. Heitman, Chem. Ber., 92, 245 (1959).
J. Piccard, Ber., 46, 1843 (1913).
J. Piccard and F. deMontollin, Helv. Chim. Acta, 6, 1011 (1923).
J. Piccard and F. Abouchy, Helv. Chim. Acta, 7, 75 (1924).
J. Piccard, Helv. Chim. Acta, 7, 789 (1924).
J. Piccard, J. Am. Chem. Soc., 48, 2355 (1926).
J. Piccard, J. Am. Chem. Soc., 48, 2878 (1926).
H. Wieland, Ber., 48, 1078 (1915).
E. Weitz and L. Mueller, Ber., 68, 2306 (1935).
A. H. Cook, I. Heilbron, and A. L. Levy, J. Chem. Soc., 1598 (1947).
G. N. Lewis and D. Lipkin, J. Am. Chem. Soc., 64 2801 (1942).
E. Weitz and H. W. Schwechten, Ber., 60, 1203 (1927).
R. Bindschedler, Ber., 16, 864 (1883).
S. Goldschmidt, Ber., 53, 44 (1920).
E. Weitz, L. Mueller, and K. Dinges, Chem. Ber., 85, 878 (1952).
A. W. Hofman, Ber., 18, 767 (1885).
W. B. Tuemmler and B. S. Wildi, J. Am. Chem. Soc., 80, 3772 (1958); cf. U.S. Pat. No. 2,813,802 (1957).
E. Weitz, Agnew. Chem., 66, 658 (1954).
D. H. Anderson et al, J. Am. Chem. Soc., 83, 3157 (1961).
U.S. Department of Commerce, Office of Technical Services, Technical Document Report No. AMRL-T-DR-62-92 (1962).

Primary Examiner—Richard D. Lovering

[57] ABSTRACT

A defined class of diaryl-(N,N-diarylaminoaryl) aminium salts usful as infrared absorbers is disclosed; especially the bis(p-dialkylaminophenyl)[N,N-bis(p-dialkylaminophenyl)-p-aminophenyl]aminium salts, such as bis(p-diethylaminophenyl)[N,N-bis(p-diethylaminophenyl)-p-aminophenyl]aminium hexafluoroantimonate. The aminium salts are obtained by oxidation of N,N,N',N'-tetraarylarylenediamines with silver salts.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 43–65:
The new aminium salts of the invention are represented by the following formula:

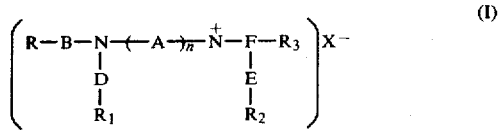
(I)

wherein A, B, D, E and F represent bivalent benzene or bivalent naphthalene radicals; n is 1 or 2; R, $R_1$, $R_2$ and $R_3$ represent hydrogen, alkyl, alkoxy, alkenyl, aralkyl, aryl, alkaryl, acyl or

radicals, said $R_4$ and $R_5$ in turn representing hydrogen, alkyl, alkenyl, aralkyl, aryl, alkaryl or acyl radicals; said A, B, D, E and F and R through $R_5$ which are other than hydrogen being either unsubstituted or substituted with inert groups such as lower alkyl, lower alkoxy, hydroxy, cyano, carboxy, sulfo, halogen and the like; and $X^-$ represents an anion. *As illustrated by the numbered examples hereinafter, $R_4$ and $R_5$ may represent hydrogen, allyl, or straight or branched chain alkyl of one to twelve carbon atoms, where at least one of $R_4$ and $R_5$ is other than hydrogen.*

AS A RESULT OF REEXAMINATION, IT HAS BEEN DETERMINED THAT:

Claims 1–7 are cancelled.

Claims 8–10 are determined to be patentable as amended.

8. A composition of matter consisting essentially of an organic plastic material capable of transmitting visible light having incorporated therein at least about 0.005% by weight of a compound of the formula:

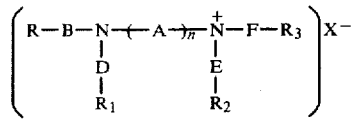

wherein A, B, D, E and F represent bivalent benzene [or bivalent naphthalene] radicals; n is 1 or 2; R, $R_1$, $R_2$ and $R_3$ represent [hydrogen, alkyl, alkoxy, alkenyl, aralkyl, aryl, alkaryl, acyl or]

radicals, said $R_4$ and $R_5$ in turn representing hydrogen, [alkyl, alkenyl, aralkyl, aryl, alkaryl or acyl radicals; said A, B, D, E and F and R through $R_5$ which are other than hydrogen being either unsubstituted or substituted with a radical selected from the group consisting of lower alkyl, lower alkoxy, hydroxy, cyano, carboxy, sulfo and halogen radicals;] *allyl or straight or branched chain alkyl of one to twelve carbon atoms, where at least one of $R_4$ and $R_5$ is other than hydrogen;* and $X^-$ represents an anion.

9. A composition of matter [according to claim 8 wherein said compound is] *which provides broad absorption of radiant energy in the near-infrared region consisting essentially of an organic plastic material capable of transmitting visible light having incorporated therein at least about 0.005% by weight of* bis(p-diethylaminophenyl)(N,N-bis(p-dibutylaminophenyl)-p-aminophenyl) aminium hexafluoroantimonate.

10. A composition of matter [according to claim 8 wherein said compound is] *which provides broad absorption of radiant energy in the near-infrared region consisting essentially of an organic plastic material capable of transmitting visible light having incorporated therein at least about 0.005% by weight of* bis(p-dibutylaminophenyl)(N,N-bis(p-dibutylaminophenyl)-p-aminophenyl) aminium hexafluoroantimonate.

* * * * *